(12) United States Patent
Hurry et al.

(10) Patent No.: US 6,320,000 B1
(45) Date of Patent: Nov. 20, 2001

(54) PROCESS FOR PREPARING POLYMERS

(76) Inventors: Jeanine Lee Hurry, 108 Tudor Dr., North Wales, PA (US) 19454; Robert Hugh Schwartz, 934 Avenue D, Parkland, PA (US) 19047; Richard Shu-Hua Wu, 1608 Conquest Way, Ft. Washington, PA (US) 19034

( * ) Notice: Subject to any disclaimer, the term of this patent is extended or adjusted under 35 U.S.C. 154(b) by 0 days.

(21) Appl. No.: 09/543,212

(22) Filed: Apr. 5, 2000

Related U.S. Application Data

(60) Provisional application No. 60/130,385, filed on Apr. 21, 1999.

(51) Int. Cl.$^7$ ........................................................ C08F 2/16
(52) U.S. Cl. .................................................................. 526/67
(58) Field of Search ................................................. 526/67

(56) References Cited

U.S. PATENT DOCUMENTS 5,346,954 * 9/1994 Wu et al. ................................ 525/85

FOREIGN PATENT DOCUMENTS 834 518 A1    4/1998  (EP) .

OTHER PUBLICATIONS

Industrial Polymerization Apparatus (IV). Emulsion Polymerization Reactors (Part 1) China Synthetic Rubber Industry 17 (5), 299–303 (1994).

* cited by examiner

*Primary Examiner*—David W. Wu
*Assistant Examiner*—William K Cheung

(57) ABSTRACT

A process for preparing polymers is disclosed. The process utilizes displacement of air in a polymerization reactor with water vapor, a closed system, and a pump at high operating pressure to pump the polymer through a heat exchanger in an external loop, resulting in reduced volatile organic compound emissions.

8 Claims, No Drawings

PROCESS FOR PREPARING POLYMERS

This is a nonprovisional application of prior pending provisional application Ser. No. 60/130,385 filed Apr. 21, 1999.

This invention relates to a process for preparing polymers resulting in reduced volatile organic compound (VOC) emissions and minimal gel formation. The process for preparing polymers utilizes the displacement of air in a polymerization reactor with water vapor, a closed system, and a pump at high operating pressure to pump the polymer through a heat exchanger in an external loop.

Polymerizations are the reactions of monomers to form polymers. There are several problems associated with polymerizations. One problem is that most polymerizations are exothermic. For exothermic polymerizations, the heat evolved during the polymerization must be removed to control the reactor temperature. Typically, reactors for polymerizations are jacketed and coolant flows through the jacket to control the temperature of the polymerization. This method of cooling is not very efficient because the cooling area is limited to the reactor jacket, and therefore the time it takes to run the polymerization is extended to as long as 10 hours.

A second problem associated with polymerizations is that pressure may build up in the reactor as a result of inert gasses in the space above the reaction mixture. Typically, reactors for polymerizations are vented so that when the pressure reaches a certain point, the vent opens and releases the gasses. The gasses vented during the polymerization process include air, water, and VOCs including unreacted monomer. Due to environmental concerns over monomers and other VOCs, when the gasses are vented they must be sent to pollution control equipment. This is known as abatement. Abatement results in increased cost to operate the polymerization reaction.

A third problem associated with polymerizations is the formation of gel. Gel is an agglomeration of polymer particles. Gel can have adverse effects on the end use applications for the polymers. Therefore, gel is undesirable.

Therefore, there is a need for a process of preparing polymers which provides better efficiency through increased cooling area, minimizes VOC emissions, and does not form a significant amount of gel.

One approach to controlling the temperature of a polymerization is disclosed in EP 834518. The disclosure teaches removing polymer from the reactor and feeding it through an external loop to a heat exchanger, then returning the polymer to the reactor. The disclosure teaches that plate and frame heat exchangers are not suitable for these purposes and that spiral heat exchangers are preferred. The pump was limited to a low shear pump and was placed on the inlet side of the heat exchanger. The disclosure does not teach how to avoid the fomation of gel or minimize VOC emissions.

The use of plate and frame heat exchangers in a system similar to that described above is disclosed in Industrial Polymerization Apparatus (IV), Emulsion Polymerization Rectors (Part 1), China Synthetic Rubber Industry, 17 (5), 299–303 (1994), L. Feng and Y. Li. The disclosure does not teach how to avoid the formation of gel or how to minimize VOC emissions.

Despite these disclosures, there is a continuing need for a process of preparing polymers which provides better efficiency through increased cooling area, minimizes VOC emissions, and does not form a significant amount of gel.

We have found that replacing air in a polymerization reactor with water vapor and using a closed system reactor with a pump run at high operating pressure meets this need. By closed system reactor is meant that inert gasses do not escape during the polymerization. By high operating pressure is meant from 25 psig to 100 psig.

The present invention provides a process for preparing polymers including: providing an open system reactor; replacing air in the reactor with water vapor; closing the system; feeding at least one monomer to the reactor; reacting the at least one monomer in the reactor to form a polymer; and pumping the polymer with a pump at high operating pressure in an external loop through a heat exchanger back to the reactor.

In a second aspect, the present invention provides a method for reducing VOC emissions during a polymerization process including: a) providing an open system reactor; b) replacing air in the reactor with water vapor; c) closing the system; d) feeding at least one monomer to the reactor; e) reacting the at least one monomer in the reactor to form a polymer; and f) pumping the polymer with a pump at high operating pressure in an external loop through a heat exchanger back to the reactor.

The reactor utilized in this invention must be able to be run in both an open system and a closed system mode. By open system is meant that inert gasses may exit the system without pressure build up. One method of providing an open system is to utilize a vented reactor where the vent is kept open.

By closed system is meant that gasses and pressure may build up in the system. One method of providing a closed system is to utilize a vented reactor where the vent is kept closed during the polymerization. Typically, in a low operating pressure system, the vent in a closed system is closed and set to open at a low pressure such as 10 psig.

The reactor may be jacketed. When the reactor is jacketed, coolant such as water flows through the jacket. The flow rate of the coolant may be constant or may vary. Generally, when jacketed reactors are utilized, 25% of the total thermal energy generated by the polymerization reaction (BTUs per minute) will be removed by the coolant in the jacket.

The process of this invention requires that the system be open while air in the reactor is replaced by water vapor. This may be accomplished by a method selected from feeding cold water to the reactor and heating the water, feeding hot water to the reactor, sparging the reactor with steam, and combinations thereof. The temperature of the hot water may range from 50° C. to 99° C., preferably 80° C. to 95° C. The amount of hot water fed to the reactor will depend upon the recipe for the polymer to be prepared and the reactor size, but in a 2500 liter reactor, the amount of water typically ranges from 90 kg to 700 kg, preferably 270 kg to 550 kg. The reactor may be sparged with steam either from the top or the bottom of the reactor.

It is known in the art that oxygen in the air within a polymerization reactor inhibits polymerization. To overcome this problem, those skilled in the art have traditionally utilized a helium or nitrogen sweep to replace the air in the reactor. The replacement of air with water vapor in the process of this invention therefore provides additional benefits by making the helium or nitrogen sweep optional, which may reduce the cost to run the process.

After air in the reactor has been replaced by water vapor, the system must be closed. In a vented system, the system may be closed by closing the vent valve. In normal operations, the closed vent valve may be set at 10 psig, meaning that if pressure builds up in the reactor, the vent valve will open when the pressure reaches 10 psig. In the process of this invention, the vent valve remains closed during the polymerization because the vent valve controller is set at a high pressure. The vent valve setting ranges from 25 psig to 100 psig, preferably from 25 psig to 40 psig.

After the system is closed, at least one monomer is fed to the reactor. Among the monomers that may be useful are ethylenically unsaturated monomers which include, but are not limited to (meth)acrylic ester monomers including methyl acrylate, ethyl acrylate, butyl acrylate, 2-ethylhexyl acrylate, decyl acrylate, methyl methacrylate, butyl methacrylate, hydroxyethyl methacrylate, and hydroxypropyl acrylate; acrylamide or substituted acrylamides; styrene or substituted styrene; vinyl acetate or other vinyl esters; vinyl monomers such as vinyl chloride, vinylidene chloride, N-vinyl pyrolidone; and acrylonitrile or methacrylonitrile. Butyl acrylate, methyl methacrylate, and styrene are preferred. By (meth)acrylic is meant both acrylic and methacrylic.

Ethylenically unsaturated acid containing monomers or salts thereof may also be useful. Suitable ethylenically unsaturated acid containing monomers include, but are not limited to acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid and methacrylic acid are preferred. Methacrylic acid is more preferred.

A fluorinated (meth)acrylate ethylenically unsaturated monomer, such as Zonyl™ products (Trademark of DuPont Chemical Company) may also be useful.

The at least one monomer may aslo be a silicone containing ethylenically unsaturated monomer, such as vinyl trimethoxy silane and methacryloxy propyl trimethoxy silane.

Monomers selected from $C_6$–$C_{20}$ alkyl styrene and alkyl-alpha-methyl styrene, $C_6$–$C_{20}$ alkyl dialkyl itaconate, $C_{10}$–$C_{20}$ vinyl esters of carboxylic acids, $C_8$–$C_{20}$ N-alkyl acrylamide and methacrylamide, $C_{10}$–$C_{20}$ alkyl alpha-hydroxymethylacrylate, $C_8$–$C_{20}$ dialkyl 2,2'-(oxydimethylene) diacrylate, $C_8$–$C_{20}$ dialkyl 2,2'-(alkyliminodimethylene)diacrylate, $C_8$–$C_{20}$ N-alkylacrylimide, and $C_{10}$–$C_{20}$ alkyl vinylether may also be useful.

Hydrophobic monomers such as $C_{12}$ to $C_{40}$ alkyl ester of (meth)acrylic acid may also be useful as the at least one monomer utilized in the process of this invention. Suitable alkyl esters of (meth)acrylic acid include, but are not limited to lauryl (meth)acrylate, cetyl (meth)acrylate, stearyl (meth)acrylate, behenyl (meth)acrylate, and eicosyl (meth) acrylate.

A cross-linker selected from a cross-linking agent and a cross-linking monomer may also be incorporated into polymers made by the process of this invention. By cross-linker is meant a compound which has at least 2 reactive groups which will react with acid groups found on the monomers of the compositions of this invention. Cross-linking agents useful in polymers made by the process of this invention include a polyaziridine, polyisocyanate, polycarbodiimide, polyamine, and a polyvalent metal. The cross-linking agent is optional, and may be added after polymerization has been completed.

Cross-linking monomers are cross-linkers which are incorporated with other monomers. Cross-linking monomers which may be useful with polymers made by the process of this invention include acetoacetate-functional monomers such as acetoacetoxyethyl acrylate, acetoacetoxypropyl methacrylate, acetoacetoxyethyl methacrylate, allyl acetoacetate, acetoacetoxybutyl methacrylate, and 2,3-di(acetoacetoxy)propyl methacrylate; divinyl benzene, (meth) acryloyl polyesters of polyhydroxylated compounds, divinyl esters of polycarboxylic acids, diallyl esters of polycarboxylic acids, diallyl dimethyl ammonium chloride, triallyl terephthalate, methylene bis acrylamide, diallyl maleate, diallyl fumarate, hexamethylene bis maleamide, triallyl phosphate, trivinyl trimellitate, divinyl adipate, glyceryl trimethacrylate, diallyl succinate, divinyl ether, the divinyl ethers of ethylene glycol or diethylene glycol diacrylate, polyethylene glycol diacrylates or methacrylates, 1,6-hexanediol diacrylate, pentaerythritol triacrylate or tetraacrylate, neopentyl glycol diacrylate, cyclopentadiene diacrylate, the butylene glycol diacrylates or dimethacrylates, trimethylolpropane di- or tri-acrylates, (meth)acrylamide, n-methylol (meth)acrylamide, mixtures thereof, and the like. (Meth)acrylamide, n-methylol (meth) acrylamide, and mixtures thereof are preferred. The amount of cross-linker utilized is chosen such that the cross-linker does not interfere with film formation.

Chain transfer agents may be used to control the molecular weight of polymers made by the process of this invention. Suitable chain transfer agents include mercaptans, such as, for example, dodecylmercaptan ("n-DDM"). The chain transfer agent may be used at from 0.1% to 10% based on the total weight of the polymeric composition.

The at least one monomer is reacted to form a polymer. The process of the invention may be useful for solution, suspension, or emulsion polymerizations. The process is particularly useful for emulsion polymerizations. Emulsion polymerizations are well known in the art and are described in U.S. Pat. No. 5,346,954, hereby incorporated by reference. Suitable surfactants, initiators, and process conditions can be found in the patent. The at least one monomer may be fed as a single monomer from the list above, or may be combinations thereof.

After being formed, the polymer and any unreacted monomer are pumped at high operating pressure in an external loop through a heat exchanger back to the reactor. Any type of pump may be utilized. For shear-sensitive polymers, a low shear pump is required. Low shear pumps are particularly important in emulsion polymerizations where the polymers are shear sensitive, as high shear will lead to the formation of a significant amount of gel. By low shear pump is meant that the pump does not significantly stress the polymer. The pump may be a diaphragm pump, such as a Wilden diaphragm pump, or a positive displacement pump such as a Sine pump, a disc flow pump, or a Moyno pump. The material of construction of the pump is not critical to the invention.

Diaphragm pumps have a diaphragm which fatigues and fails when subjected to higher operating pressures (greater than 10 psig) for an extended period of time. Typically, diaphragm pumps are operated with the reactor vent valve settings so that the operating pressure remains low, such as 10 psig or lower. For the process of the invention, the pump is operated with reactor vent valve controller settings from 25 psig to 100 psig, preferably from 25 psig to 40 psig. To operate at reactor vent valve controller settings from 25 psig to 100 psig without the eventual fatigue and failure of the pump, a low shear pump such as a Sine pump, a disc flow pump, or a Moyno pump may be utilized.

The position of the pump is important in minimizing gel formation. The pump may be placed in front of the heat exchanger, however gel formation is minimized when the pump is placed at the exit of the heat exchanger.

The heat exchanger may be a shell and tube, plate and frame, plate and fin, or spiral heat exchanger. Plate and frame heat exchangers are preferred. The material of construction of the heat exchanger is not critical to the invention. The heat exchanger may be cooled by a flow of cool water or coolant. The flow rate of water or coolant may be constant or may vary. Preferably, the flow rate of water or coolant is constant. The temperature of the water or coolant typically ranges from 8° C. to 35° C.

In a preferred embodiment, the temperature of the polymer and unreacted monomer in the reactor is controlled by controlling the flow rate of polymer and unreacted monomer through the heat exchanger. The temperature in the reactor may be monitored electronically. If the temperature is above the desired set point, the rate at which the polymer is pumped through the heat exchanger is increased. This may be accomplished through the use of an electronic feedback controller which automatically increases the setting on the pump. This process leads to improved temperature control in the polymerization reaction and lower gel formation.

Alternatively, the temperature of the polymer in the reactor may be controlled by controlling the flow rate of water through the heat exchanger. The temperature of the polymer exiting the heat exchanger typically ranges from 20° C. to 70° C., preferably ranges from 30° C. to 45° C.

By external loop is meant a pipe or hose that takes polymer from the reactor, feeds the polymer to a heat exchanger, and returns the polymer to the reactor. The material of construction of the external loop is not critical to the invention.

The polymerization may be run continuously, where polymer is withdrawn from the reactor while monomer is fed to the reactor. In this case, the polymer leaving the heat exchanger may be split into two streams, wherein one stream may be fed back to the reactor and the other stream may be fed to a post processing tank for further processing.

In another embodiment where the polymerization may be run continuously, two external loops are provided. In this embodiment, one external loop may withdraw polymer from the reactor and feed the polymer through the heat exchanger back to the reactor, while the other external loop may withdraw polymer from the reactor and feed the polymer through the heat exchanger to the post processing tank for further processing.

The process of the invention is operated at higher reactor vent valve controller settings and generates less pressure. Therefore the process of the invention does not vent gas to pollution control equipment during the polymerization. At the end of the polymerization, there may be residual pressure in the reactor. This residual pressure may be used to transfer the latex from the reactor to the post processing tank. The reactor pressure will decrease to normal pressure as the transfer of latex is completed. The boiling point of butyl acrylate is 142° C. and the boiling point of methyl methacrylate is 100° C. When the reactor is empty, the reactor jacket cooling water can be turned on to condense any residual monomer. Then, the condensed monomer can be removed with reactor rinse water. The rinse water can either be sent to the post processing tank as dilution water for the final product, or be sent to a waste water treatment facility.

The following Examples are intended to demonstrate the process of this invention. The Examples should not be construed as limiting the scope of the invention.

EXAMPLE 1

A batch of butyl acrylate/methyl methacrylate polymer ("latex") was prepared in a 2430 liter stainless steel vented reactor. The monomers (962 kg) were premixed with water (1035 kg) and surfactants (5.4 kg) in a monomer emulsion tank. Non-condensable air was partially replaced by condensable water vapor at the beginning of the batch by adding 345 kg hot water (90° C. to 99° C.) into the reactor. While the hot water was being added, the reactor vent was opened. After the hot water was added, ammonia persulfate and other additives were added to the reactor and the reactor vent line was closed. The reactor vent pressure (operating pressure) automatic controller setpoint was set at 40 psig. The monomer emulsion was fed over a two and one half hour period. Throughout the reaction the reactor was maintained at 83° C. The reaction temperature was maintained by an external Alpha Laval plate and frame heat exchanger.

The Alfa Laval heat exchanger was used to control the reaction temperature. The reactor jacket was not used. A reactor temperature controller manipulated a Wilden diaphragm pump to adjust the latex flow rate through the heat exchanger. When the reaction temperature was above the desired set point the controller increased the pump setting and increased the latex flow rate through the heat exchanger.

Because the latex was shear sensitive and was sensitive to gel formation, a Wilden low shear pump was used to pump the latex through the heat exchanger. The pump was located at the exit of the heat exchanger so that cool latex was pumped.

Results

The reactor pressure rose as the volume level increased. With the air partially replaced by water vapor, the increased pressure compressed/condensed the steam to water and the reactor pressure increased slowly without venting. The peak pressure in the reactor was monitored and never exceeded 22 psig. Therefore, there was no venting of gas during the monomer emulsion feed period.

At the end of the batch there was minimal reactor head space gas that was vented to pollution control equipment. A batch of latex within specification was obtained. The latex was passed through a 325 mesh screen. For gel to be retained on the screen, the particle size would be greater than 45 micrometers. No significant gel formation was noted (less than or equal to 20 ppm of gel).

EXAMPLE 2

Comparative Calculation

The inventors calculated what the pressure in the reactor would be without replacing the air in the reactor with water vapor.

Assuming the valve was closed before the hot water was fed to the reactor and the temperature of the air in the reactor was 25° C., the calculation is as follows: the initial air pressure (P1) was 15 psia and the initial volume (V1) was 2430 liters, and the final air pressure (P2) was 77 psia (62 psig) with a final volume (V2) of 600 liters. Therefore, under an operating pressure of 40 psig without replacing the air in the reactor with water vapor prior to closing the vent, the reactor would have vented during the polymerization.

What is claimed:

1. A process for preparing polymers comprising:

providing an open system reactor;

replacing air in the reactor with water vapor;

closing the system;

feeding at least one monomer to the reactor;

reacting the at least one monomer in the reactor to form a polymer; and pumping the polymer at high operating pressure in an external loop through a heat exchanger back to the reactor.

2. The process according to claim 1 wherein the reactor is a vented reactor and air in the reactor is replaced by water vapor by a method selected from feeding cold water to the reactor and heating the water, feeding hot water to the reactor, sparging the reactor with steam, and combinations thereof.

3. The process according to claim 2 wherein the pump is a low shear pump positioned at the exit of the heat exchanger.

4. The process according to claim 3 wherein the operating pressure is from 25 psig to 100 psig.

5. A method for reducing VOC emissions during a polymerization process comprising:
  a) providing an open system reactor;
  b) replacing air in the reactor with water vapor;
  c) closing the system;
  d) feeding at least one monomer to the reactor;
  e) reacting the at least one monomer in the reactor to form a polymer; and
  f) pumping the polymer at high operating pressure in an external loop through a heat exchanger back to the reactor.

6. The method according to claim 5 wherein the reactor is a vented reactor and air in the reactor is replaced by water vapor by a method selected from feeding cold water to the reactor and heating the water, feeding hot water to the reactor, sparging the reactor with steam, and combinations thereof.

7. The method according to claim 6 wherein the pump is a low shear pump positioned at the exit of the heat exchanger.

8. The method according to claim 7 wherein the operating pressure is from 25 psig to 100 psig.

\* \* \* \* \*